US012353389B2

(12) United States Patent
Khurana et al.

(10) Patent No.: US 12,353,389 B2
(45) Date of Patent: Jul. 8, 2025

(54) CUSTOMIZED CODE CONFIGURATIONS FOR A MULTIPLE APPLICATION SERVICE ENVIRONMENT

(71) Applicant: Databricks, Inc., San Francisco, CA (US)

(72) Inventors: Amandeep Khurana, San Francisco, CA (US); Nong Li, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 192 days.

(21) Appl. No.: 15/942,150

(22) Filed: Mar. 30, 2018

(65) Prior Publication Data

US 2019/0303466 A1    Oct. 3, 2019

(51) Int. Cl.
*G06F 16/22*         (2019.01)
*G06F 8/70*          (2018.01)
*G06F 9/54*          (2006.01)
*G06F 16/2455*       (2019.01)
*G06F 16/2457*       (2019.01)
*G06F 16/248*        (2019.01)
*G06F 16/28*         (2019.01)

(52) U.S. Cl.
CPC .......... *G06F 16/2272* (2019.01); *G06F 8/70* (2013.01); *G06F 9/54* (2013.01); *G06F 16/24568* (2019.01); *G06F 16/2457* (2019.01); *G06F 16/248* (2019.01); *G06F 16/284* (2019.01)

(58) Field of Classification Search
CPC .. G06F 16/2272; G06F 16/248; G06F 16/284; G06F 16/2457; G06F 16/24568; G06F 8/70; G06F 9/54; G06F 8/71
See application file for complete search history.

(56) References Cited

U.S. PATENT DOCUMENTS

| 7,139,761 | B2 | 11/2006 | McKibben et al. |
| 7,447,681 | B2 | 11/2008 | Lightstone et al. |
| 8,214,393 | B2* | 7/2012 | Joshi ............... G06F 16/25 707/780 |
| 9,513,901 | B2 | 12/2016 | Chen et al. |
| 2003/0172047 | A1 | 9/2003 | Hosali et al. |

(Continued)

FOREIGN PATENT DOCUMENTS

CN        101645010 A       2/2010

*Primary Examiner* — Ann J Lo
*Assistant Examiner* — Fernando M Mari Valcarcel
(74) *Attorney, Agent, or Firm* — Fenwick & West LLP

(57) ABSTRACT

Disclosed herein provides enhancements for operating a data access system for large data processing environments. In one implementation, a method provides for maintaining a data structure comprising a plurality of customized code configurations each associated with a data request rule for each of the multiple application services. A code configuration query from a user is then received indicating a data request rule. The code configuration query requests code configurations for data retrieval from at least one of the multiple storage services over the data access system. The data structure is queried for one or more customized code configurations for each of the multiple application services associated with the indicated data request rule. The user is then provided with the one or more customized code configurations for each of the multiple application services associated with the indicated data request rule.

18 Claims, 7 Drawing Sheets

(56) References Cited

U.S. PATENT DOCUMENTS

| | | | | |
|---|---|---|---|---|
| 2013/0007710 | A1* | 1/2013 | Vedula | G06F 9/5061 |
| | | | | 717/124 |
| 2014/0365467 | A1* | 12/2014 | Dessau | G06F 16/90324 |
| | | | | 707/722 |
| 2014/0372963 | A1* | 12/2014 | Chandaria | G06F 8/00 |
| | | | | 717/100 |
| 2015/0310526 | A1* | 10/2015 | Warren | G06F 16/951 |
| | | | | 705/26.62 |
| 2015/0363191 | A1* | 12/2015 | Shanmugam | H04L 67/42 |
| | | | | 717/101 |
| 2016/0105328 | A1* | 4/2016 | Cooper | G06F 9/546 |
| | | | | 715/736 |
| 2016/0147879 | A1* | 5/2016 | Huang | G06F 16/248 |
| | | | | 707/711 |
| 2016/0188383 | A1* | 6/2016 | Contractor | G06F 9/54 |
| | | | | 719/320 |
| 2017/0048222 | A1* | 2/2017 | Wise | G06F 16/24575 |
| 2017/0052835 | A1* | 2/2017 | Cook | G06F 16/9024 |
| 2017/0168993 | A1* | 6/2017 | Prakash | G06T 11/206 |
| 2017/0277518 | A1* | 9/2017 | Krishnan | G06F 8/35 |
| 2017/0371937 | A1* | 12/2017 | Shah | G06F 8/71 |
| 2018/0024731 | A1* | 1/2018 | Sanches | G06F 16/26 |
| | | | | 715/763 |
| 2018/0088925 | A1* | 3/2018 | Emeis | G06T 11/206 |
| 2018/0089005 | A1* | 3/2018 | Green | G06F 9/547 |

\* cited by examiner

PREVIEW OF TRANSACTIONS_ACTIVE_USERS

| txnid | last_active_time | transaction_time | sku | userid | price | credit card |
|---|---|---|---|---|---|---|
| 3280710 | 10/28/16 14:07 | 07/12/16 07:47 | sku31 | 43650 | 75.45 | 5076-5489-4161-4642 |
| 4015423 | 12/12/16 05:35 | 01/23/16 06:06 | sku75 | 56123 | 51.52 | 8520-6547-9632-4563 |
| 8962456 | 11/18/16 09:19 | 12/28/16 19:07 | sku15 | 85135 | 106.21 | 1563-7412-6542-6640 |
| 1425874 | 10/23/16 03:08 | 11/17/16 03:54 | sku68 | 71654 | 901.61 | 8500-9322-6452-7889 |
| 2642158 | 11/08/16 14:07 | 01/31/16 12:14 | sku20 | 15365 | 15.64 | 5213-1541-9654-1264 |
| 9244665 | 12/15/16 12:47 | 04/17/16 11:08 | sku81 | 41564 | 85.36 | 9600-7485-9874-6541 |
| 7526411 | 12/30/16 13:14 | 10/23/16 19:52 | sku09 | 02574 | 85.01 | 3037-5220-8965-8336 |
| 0225785 | 11/27/16 11:53 | 12/24/16 15:12 | sku57 | 65281 | 12.85 | 4085-9659-7412-1236 |
| 4501354 | 12/18/16 17:35 | 04/30/16 05:38 | sku84 | 36524 | 950.01 | 2045-2667-5963-4211 |
| 2058595 | 10/25/16 09:54 | 11/08/16 08:10 | sku12 | 96154 | 39.98 | 1059-9855-8300-0064 |
| 9751234 | 12/06/16 02:02 | 10/24/16 14:20 | sku25 | 42675 | 20.51 | 9874-1254-6501-9632 |
| 8012632 | 11/30/16 18:17 | 19/20/16 06:07 | sku61 | 89632 | 22.21 | 4093-3574-5641-5142 |

CUSTOMIZED CODE CONFIGURATIONS FOR A MULTIPLE APPLICATION SERVICE ENVIRONMENT

TECHNICAL BACKGROUND

An increasing number of data-intensive applications are being developed to serve various needs, such as processing very large data sets. Multiple storage services employed on clusters of computers are used to distribute various data. In addition to the multiple storage services, various large-scale processing applications have been developed to interact with the large-scale data sets and perform data management tasks, such as organizing and accessing the data and performing related operations with respect to the data.

To deploy the large-scale processing of data from multiple storage services in a computing environment, users are often required to individually configure the programs to operate on a specific application service. These individually configured programs operating on each of the application services are typically not operable on a different application service or must be manually rebuilt by an administrator to adapt to the new application service environment. This rebuilding of each of the application services can be time consuming and cumbersome as each application service may have different deployment parameters.

Additionally, each application service and storage service may require a determination of different data access and deployment requirements, such as determining authorization, performance, and caching parameters. Therefore, current techniques for enabling a user to operate the diverse application services available when accessing large-scale data sets from a variety of storage services are neither efficient nor effective.

OVERVIEW

The technology disclosed herein provides enhancements for operating a data access system for multiple application service environments. In one implementation, a method provides for maintaining a data structure comprising a plurality of customized code configurations each associated with a data request rule for each of the multiple application services. A code configuration query from a user is then received indicating a data request rule. The code configuration query requests code configurations for data retrieval from at least one of the multiple storage services over the data access system. The data structure is queried for one or more customized code configurations for each of the multiple application services associated with the indicated data request rule. The user is then provided with the one or more customized code configurations for each of the multiple application services associated with the indicated data request rule.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates a user interface preview for generating customized code configurations in a multiple application service environment according to one implementation.

TECHNICAL DISCLOSURE

Figure 1:
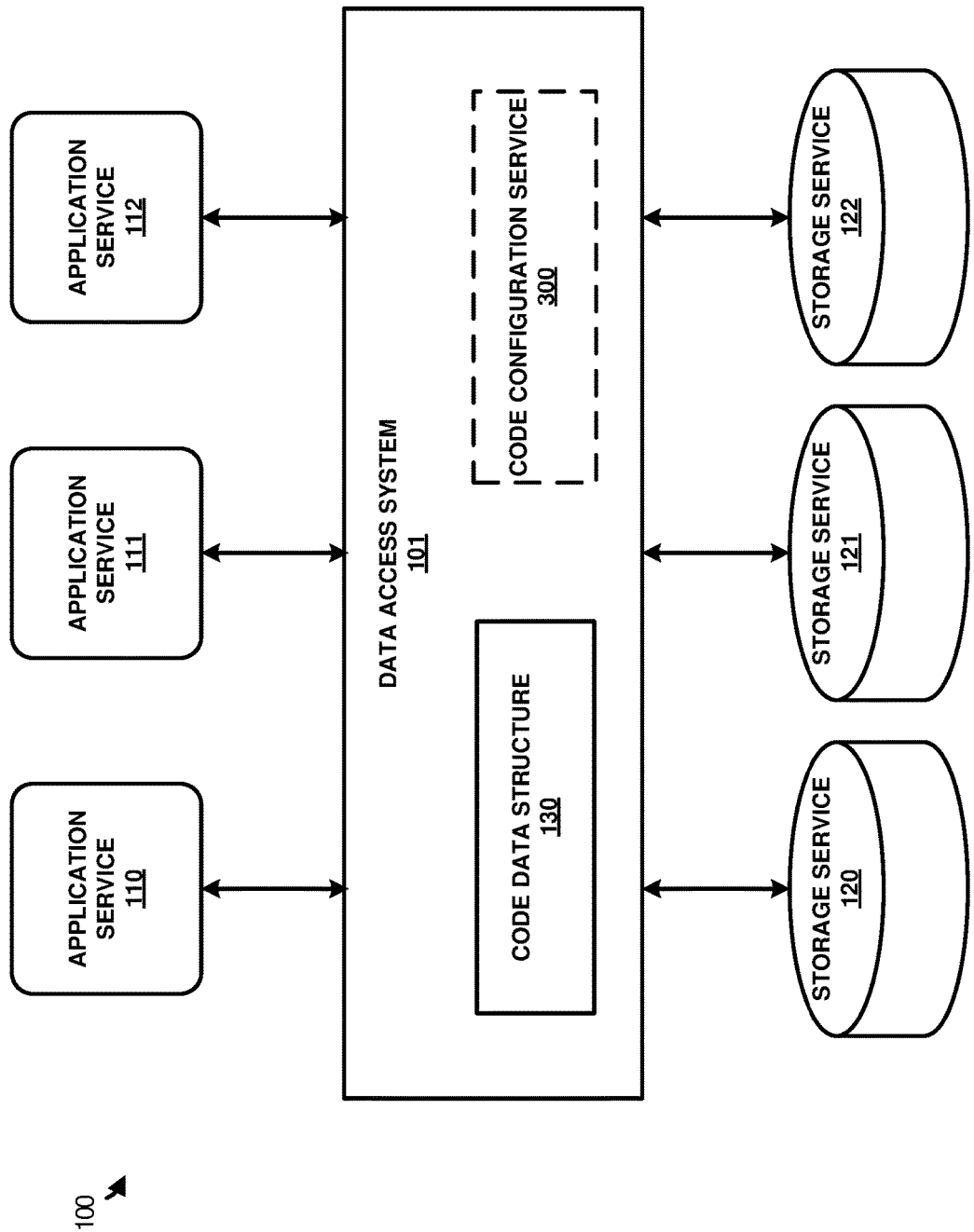
FIG. 1 illustrates a data access system for generating customized code configurations in a multiple application service environment according to one implementation.

Large data processing environments may employ a plurality of data access systems to provide efficient handling of data exchange between multiple application services and multiple storage services. Application services may include a variety of interactive computer applications for organization, analysis, and storages of data. These application services may include a distributed application, an Open Database Connectivity (ODBC) service, a Representational State Transfer (REST) service, or other similar types of application services capable of organizing and deploying data. For example, application services may include a spreadsheet service, a Spark service, a Python service, a Hive service, and the like.

In addition to the application services, various storages services are made available that may store digital data on computer components, such as memory. Storage services may comprise a file system, a Relational Database Management System (RDBMS), or a data stream. For example, storage services may be a Hadoop Distributed File System (HDFS), a Simple Storage Service (S3), Kafka, Kinesis, DynamoDB, HBase, versions of the Google file system, or some other custom data store—including combinations thereof. The data may be stored and retrieved on the same physical computing systems or on separate physical computing systems and devices. Data storage and data sources may also be stored using object storage systems.

To retrieve data, application services may desire to query a variety of storage systems, such as by creating a workload job process. These workload job processes may include Hadoop processes, Spark processes, or other similar large data job processes to the host computing systems storing the data to be queried. In some implementations, the large data in the storage service may by stored on private serving computing systems, operating for a particular organization. However, in other implementations, in addition to or in place of the private serving computing systems, an organization may employ a cloud environment, such as Amazon Elastic Compute Cloud (Amazon EC2), Microsoft Azure, Rackspace cloud services, or some other cloud environment, which can provide on demand virtual computing resources to the organization. Within each of the virtual computing resources, or virtual machines, provided by the cloud environments, one or more virtual nodes may be instantiated that provide a platform for the large-scale data processing.

In the present implementation, to efficiently deploy the data from the storage services to the application services within the network, a data access system is created that includes the runtime operations required for retrieving and processing the data within the environment. In particular, the data access system may be responsible for providing an interface for gathering data from a specified storage system, displaying the data, enforcing security and authorization policies, or any other similar procedure for the data retrieval and display service. Further, the data access systems may be responsible for organizing and managing the data based on their source storage service and destination application service within the processing environment.

To retrieve and organize the data from a source storage service to a destination application service, various code configurations may be required for interfacing the exchange of data between the source storage service and a querying application service. The code configurations may include blocks of program code to be run using the application service, such as Spark, Python, Hive, etc. The code configurations may also include exported file code templates to be run using the application service, such as using a spreadsheet application, presentation application, table and/or notebook application for organizing data, and the like. Since each application service requires separate code configurations to be used, a code configuration must be generated for each application service.

The code configuration may be generated based on various requirements of the data and user, such as IP addressing requirements for the data, memory requirements for the data (e.g., amount and/or location of the memory addresses that will be allocated to the data), processing requirements, (e.g., the number of cores that will be allocated to the data), or any other similar processing or addressing information requirement for the data and/or user. Based on the type of data requested by the user as indicated in a code configuration query, a code configuration for each of the available application services may be generated within a computing environment.

FIG. 1 illustrates a computing environment 100 to operate a data access system according to one implementation. Computing environment 100 includes data access system 101, application services 110-112, and storage services 120-122. Data access system 101 is an example of a data access system described herein, and includes code data structure 130 and code configuration service 300 that may execute on one or more physical computing systems. This computing system may include desktop computing systems, server computing systems, or any other similar physical computing system capable of providing a platform for data access system 101.

In operation, data access system 101 may maintain data structure 130 comprising a plurality of customized code configurations each associated with a data request rule for each of multiple application services 110-112. Data access system 101 then receives a code configuration query from a user indicating a data request rule. The code configuration query requests code configurations for data retrieval from at least one of multiple storage services 120-122 over data access system 101. In response to receiving the code configuration query, data access system 101 queries data structure 130 for one or more customized code configurations for each of multiple application services 110-112 associated with the indicated data request rule. The code configurations are generated for each application service 110-112 which may be used to access the data over access system 101. Once data access system 101 queries data structure 130 for one or more customized code configurations, data access system 101 provides the one or more customized code configurations for each of multiple application services 110-112 associated with the indicated data request rule to the user.

A technical effect that may be appreciated from the present discussion is the increased efficiency in initiating a data analytics search by a user and providing a user with the customized code required to begin interacting with the data access system, regardless of the user's application service (e.g., Spark, Hive, Python, spreadsheet application, etc). This reduces the time required for the user to gain access to data and increases user productivity. The embodiments described herein also allow the data access system to suggest code configurations to access additional data that may be of interest to the user (e.g., popular data requests made by other users in the same department, data requests for more recent or up-to-date data, additional data requests that are related to the initial data request, etc.). Therefore, another technical effect that may be appreciated from the present discussion is an improvement in the user's ability to access additional data which may not have been of an initial interest to the user and providing the user with the code configuration to access the additional data.

Figure 2:
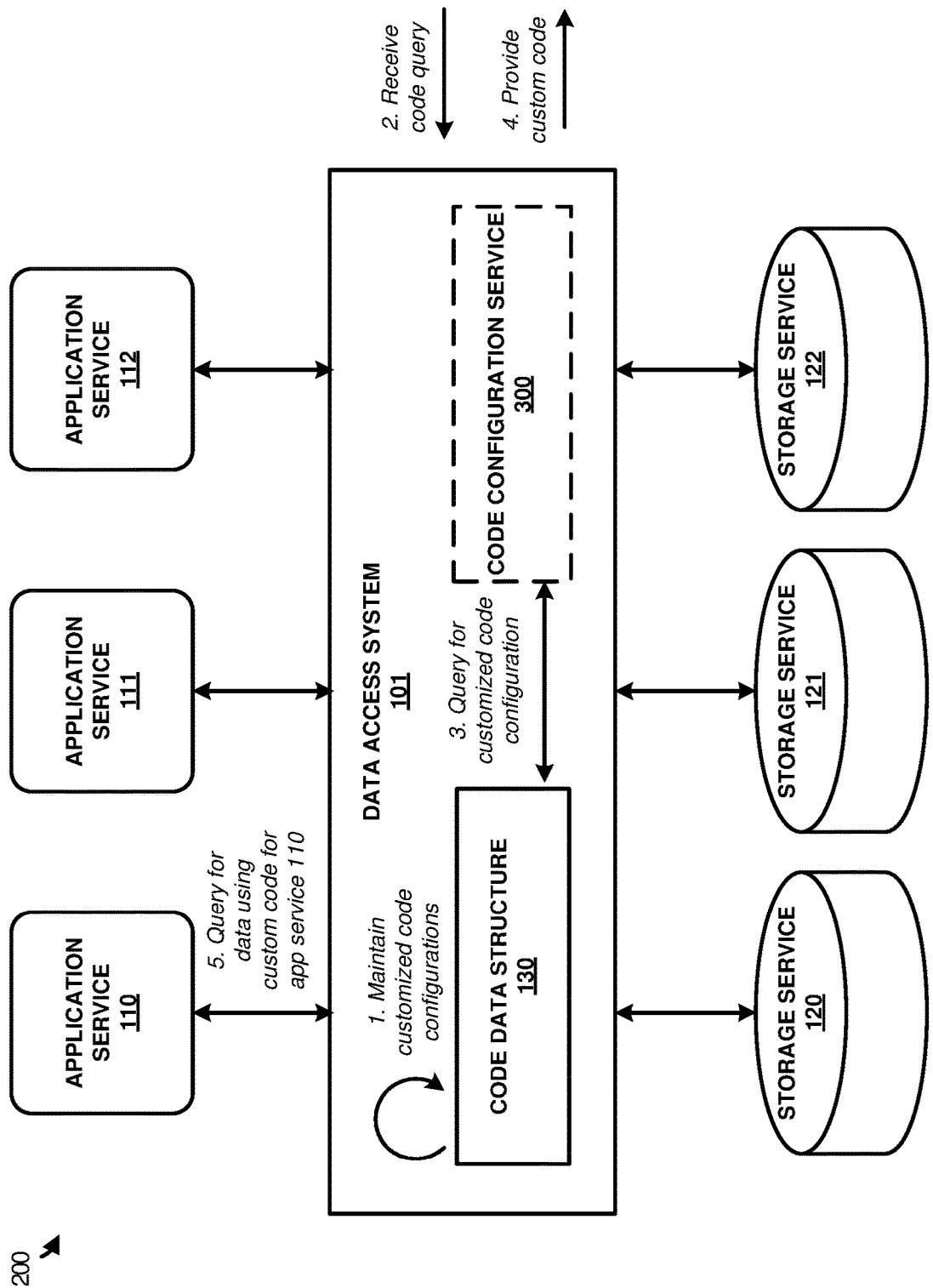
FIG. 2 illustrates an operational scenario of generating customized code configurations in a multiple application service environment according to one implementation.

Referring now to FIG. 2, FIG. 2 illustrates an operational scenario 200 of operating a data access system. Operational scenario 200 includes systems and elements from computing environment 100 of FIG. 1. As depicted, at step 1, data access system 101 maintains data structure 130 comprising a plurality of customized code configurations each associated with a data request rule for each of multiple application services 110-112. The data request rule may include the type of data search or dataset search initiated by the user. The data request rule may be entered by the user, such as the user typing in a search bar for code configurations related to sales data. However, the data request rule may be suggested by data access system 101. In other examples, the user may be presented with a list or library of data request rules which may be used to initiate code configuration. The user may select a first data request rule and then dynamically modify, add, or delete sections from the given code configuration.

Application services 110-112 may comprise a distributed application, an ODBC service, an REST service, or some other similar application service that may query various storage systems for data. It should be noted that each of application services 110-112 may require a unique code configuration based on their proprietary characteristics. Therefore, a separate code configuration is be generated for each of application services 110-112. The code configurations are stored in data structure 130 such that data access system 101 may quickly retrieve all code configurations relating to a specified data request rule for each service application 110-112. Furthermore, the code configurations may include various parts of code data which may be selectively added, omitted, or rearranged based on the data request rule, type of application service 110-112, user preferences, user type, dataset type, dataset size, user access type, etc.

In addition to maintaining the customized code configurations in code data structure 130, data access system 101, at step 2, receives a code configuration query from a user indicating a data request rule. The code configuration query requests code configurations for data retrieval from at least one of storage services 120-122 over data access system 101. Storage services 120-122 may comprise a file system, an RDBMS, or a data stream. For example, storage services 120-122 may be a Hadoop Distributed File System (HDFS), a Simple Storage Service (S3), Kafka, Kinesis, DynamoDB, HBase, or some other custom data store.

In response to receiving the code configuration query, data access system 101, at step 3, queries data structure 130 for one or more customized code configurations for each of multiple application services 110-112 associated with the indicated data request rule. In some example scenarios, the code configuration query from the user further indicates a user type. In this example scenario, the one or more customized code configurations for each of multiple application services 110-112 may be provided based on the indicated user type.

In other examples, the code configuration query from the user further indicates an access level and the one or more customized code configurations for each of multiple application services 110-112 is provided based on the indicated access level. In a further example, the code configuration query from the user further indicates a dataset type. In this example scenario, the one or more customized code configurations for each of multiple application services 110-112 may be provided based on the indicated dataset type. Additionally, data access system 101 may query data structure 130 for additional code configurations that may be suggested to the user for additional data that the user would likely be interested in. The additional code configurations may be suggested to the user based on the user type, the dataset type, the user's access level, user preferences and history, dataset size, popular searches performed by user of the same group, more recent data analytics or updated data analyitics, and the like.

Figure 3:
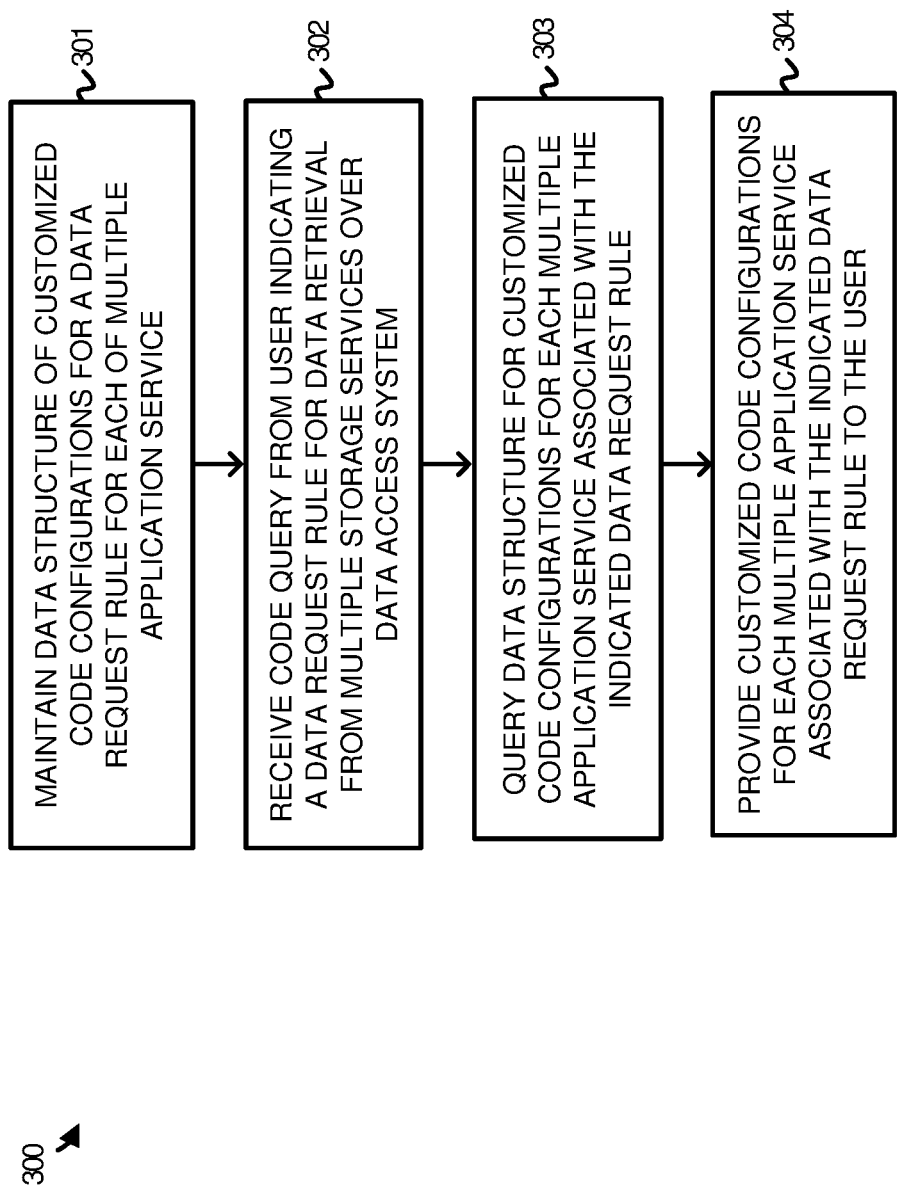
FIG. 3 illustrates a flow diagram for generating customized code configurations in multiple application service environments.

Once data access system 101 queries data structure 130 for one or more customized code configurations, at step 4, data access system 101 provides the one or more customized code configurations for each of multiple application services 110-112 associated with the indicated data request rule to the user. Data access system 101 may provide the one or more customized code configurations by surfacing a view of each of the one or more customized code configurations for each of multiple application services 110-112 associated with the indicated data request rule to the user. Data access system 101 may also provide the one or more customized code configurations by exporting a file including each of the one or more customized code configurations for each of multiple application services 110-112. Other methods of providing the user with the customized code configurations are also available, such as saving the customized code configuration as a file which may later be used by the user for one of multiple application services 110-112. In some scenarios, data access system 101 further displays a preview of data retrieved by executing the customized code data. At step 5, the user may then query data access system 101 for the data using the customized code for application service 110, To further demonstrate the operations of computing environment 100, FIG. 3 is provided. FIG. 3 illustrates a method of operating code configuration service 300 in a multiple application service environment according to one implementation. The operations of FIG. 3 are described in the paragraphs that follow with reference to systems and objects of computing environment 100 from FIG. 1.

As illustrated in FIG. 3, the method begins with code configuration service 300 maintaining (301) data structure 130 comprising a plurality of customized code configurations each associated with a data request rule for each of the multiple application services. For example, application services 110-112 may comprises a spreadsheet service, a Spark service, a Python service, an Hive service, notebook and table service to organize data, and the like. The customized code configurations may be blocks of program code which will be run using each of application services 110-112, such as Spark, Python, Hive, etc. The code configurations may also include exported or saved file code templates to be run using application service 110-112, such as using a spreadsheet application, presentation application, table and/or notebook application for organizing data, and the like.

Next, data access system 101 receives (302) a code configuration query from a user indicating a data request rule, wherein the code query requests code configurations for data retrieval from at least one of the multiple storage services over the data access system. For example, the data request rule may indicate that the user would like to search for company sales data from the previous quarter. In another example, data access system 101 may further suggest additional data request rules that may be of interest to a user. For example, data access system 101 may suggest that in addition to the requested sales data for the latest quarter, the user may also likely be interested in seeing dataset recently requested by the user's manager.

In response to receiving the code configuration request, data access system 101 queries (303) the data structure for one or more customized code configurations for each of the multiple application services associated with the indicated data request rule. For example, data configuration service 300 may query code data structure 130 for code configurations to initiate retrieval of sales data for a company's latest quarter stored on storage services 120-122. Data access system 101 may further query the sales data based on the user type, such as the user status. For example, a manager may receive additional code configurations which allow the manager to retrieve additional data relating to the company's sales from the latest quarter, such as data relating to sales made per department or per employee from the latest quarter.

Another example may include data access system 101 querying code data structure 130 for customized code configurations for each of application services 110-112 based on the user's access level. For example, stockholders of the company may be allowed to only view a limited amount of data relating to the company's latest quarter. However, a department manager may be enabled to view additional data or additional datasets based on the manager's authorization credentials. Therefore, the code configurations would be customized based on the user's access level.

In a further example, data access system 101 may query code data structure 130 for customized code configurations based on the dataset type. For example, a requested dataset may include an excessive volume of data which the user may not have interest in. Data access system 101 may query code data structure 130 for either more data or less data based on the user's processing capabilities and/or preferences indicating that only data that is determined to be most meaningful to a user should be retrieved. The customized code configurations may further be partitioned to allow a user to selectively build the customized code configurations for each application service 110-112. For example, the user may be presented with a code block for each type of analytics process related to the current data request rule. The user may then selectively copy and paste blocks of code into one of application services 110-112.

In a final operation, data access system 101 provides (304) the one or more customized code configurations for each of the multiple application services associated with the indicated data request rule to the user. For example, data access system 101 may determine that a Spark service, a Hive service, and a spreadsheet application service are each capable of using a code configuration to retrieve the company's sales data for the latest quarter, but not a Python service. Data access system 101 may then surface a unique code blocks for each of the Spark service and the Hive service to the user. The user may then copy and paste the desired code blocks into the Spark service and/or the Hive service to retrieve the sales data over data access system 101. Data access system 101 may also export or save a file for the user which enables the user to access the sales data through data access system 101 using the spreadsheet application.

Figure 4:
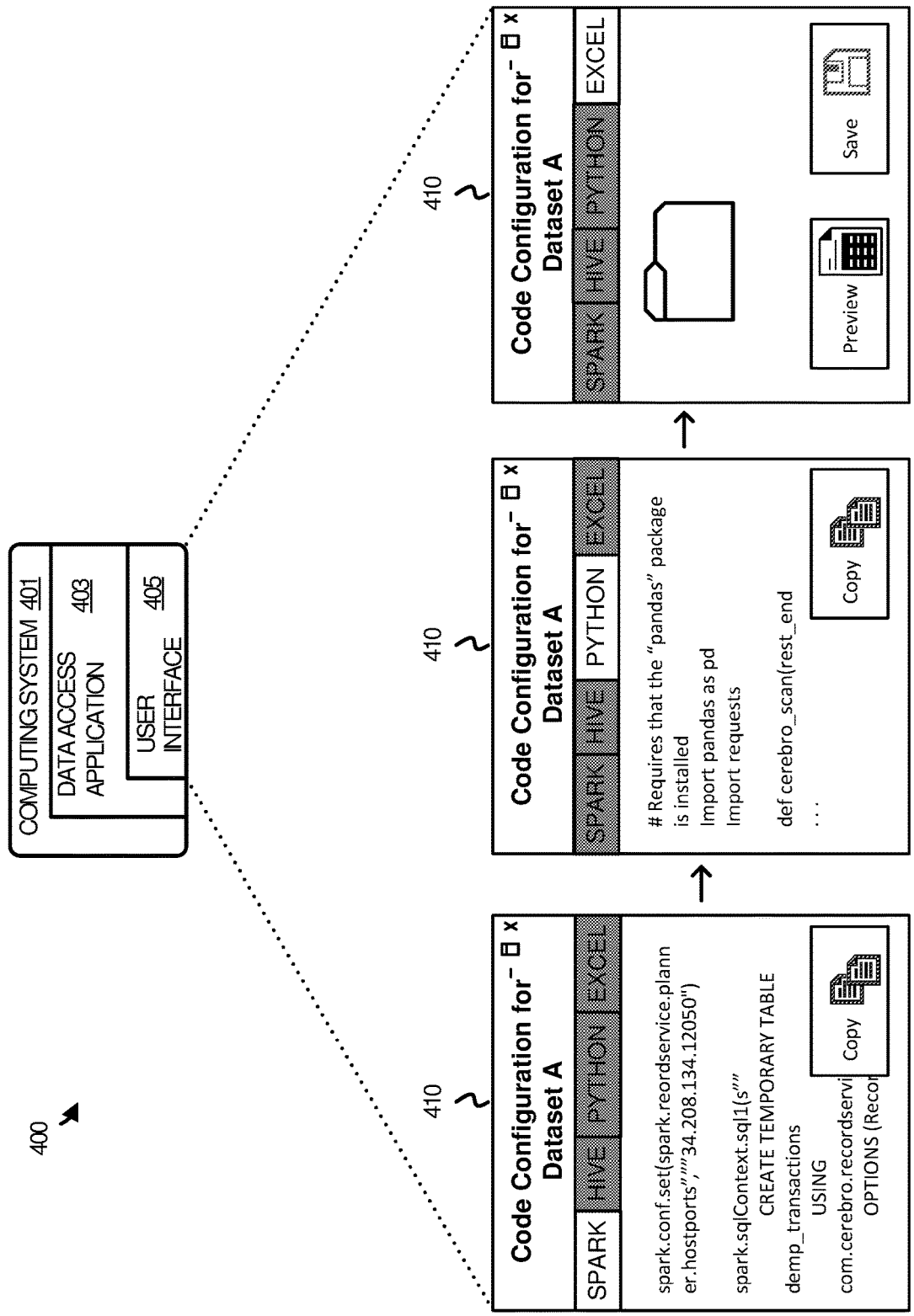
FIG. 4 illustrates a user interface for generating customized code configurations in multiple application service environment according to one implementation.

FIG. 4 illustrates data access environment 400 to surface a view of each of the customized code configurations for each of the application services according to one implementation. Data access environment 400 includes computing system 401. Computing system 401 employs data access application 403 in the context of producing views in user interface 405. User interface 405 displays various customized code configurations in representative view 410 which are produced by data access service 403.

Figure 7:
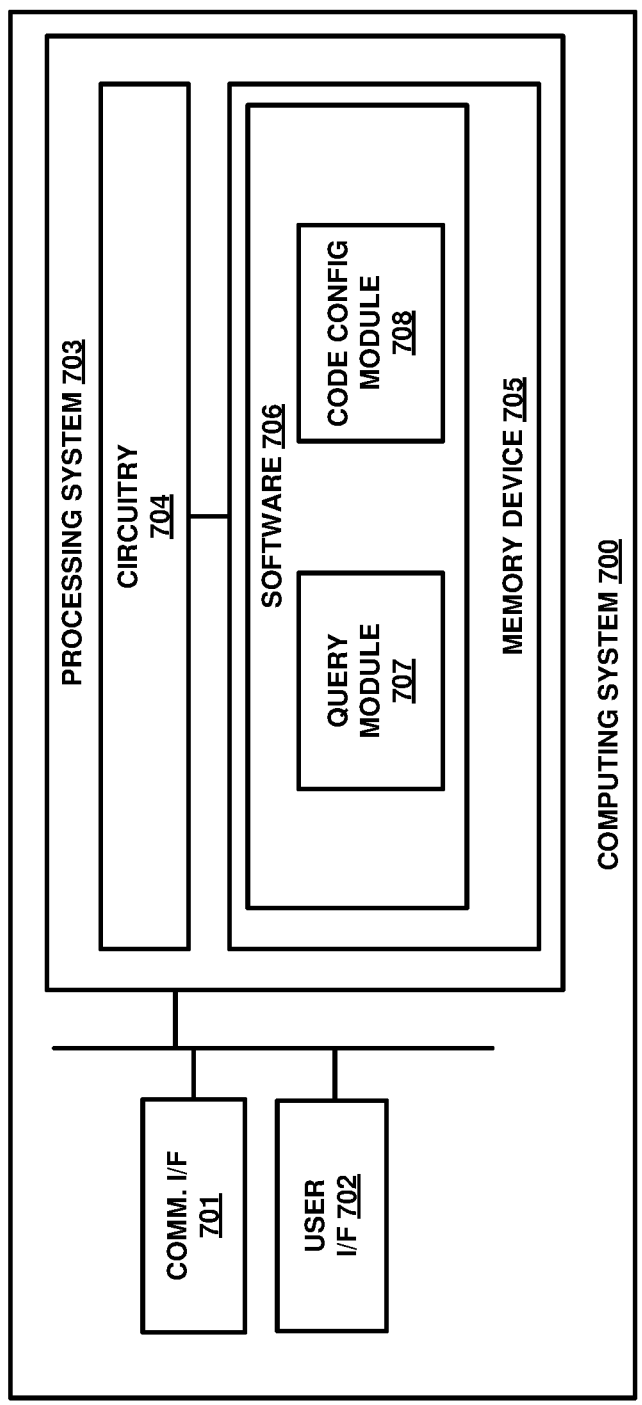
FIG. 7 illustrates a computing system to generate customized code configurations in a multiple application service environment according to one implementation.

Computing system 401 is representative of any device capable of running an application natively or in the context of a web browser, streaming an application, or executing an application in any other manner Examples of computing system 401 include, but are not limited to, personal computers, mobile phones, tablet computers, desktop computers, laptop computers, wearable computing devices, or any other form factor, including any combination of computers or variations thereof. Computing system 401 may include various hardware and software elements in a supporting architecture suitable for providing customized code configurations for various application services. One such representative architecture is illustrated in FIG. 7 with respect to computing system 700.

Computing system 401 also includes a data access application 403 which is capable of maintaining a data structure of code configurations for various application services, receiving code configuration requests from users, querying the data structure for the customized code configurations, and providing the customized code configurations to the user in accordance with the processes described herein. The data access application 403 may be implemented as a natively installed and executed application, a web application hosted in the context of a browser, a streamed or streaming application, a mobile application, or any variation or combination thereof.

User interface 405 includes representative view 410 that may be produced by data access application 403. In particular, representative view 410 includes a code configuration for Dataset A using a Spark application. The Spark application may be selected by pressing the Spark tab in user interface 405 of data access application 403. As can be seen by the arrow, a user may next select the Python tab to reveal the customized code configuration for Dataset A using a Python application. In both versions of representation view 410 for the Spark application and the Python application, the user has the ability to copy the customized code blocks. The user may then paste the code blocks into the corresponding application service. In a final version of representation view 410, a user has selected the Microsoft® Excel tab where the user may export or save a template code configuration file. Representation view 410 for the Microsoft® Excel tab also allows the user to preview the output presentation of Dataset A. Although the preview feature has been shown in only one version of representation view 410, it should be understood that data access application 403 may be enabled to generate a preview for additional application services.

FIG. 5 illustrates an exemplary preview of data retrieved by executing the customized code data according to one implementation. As seen in preview 500, various data has been allocated to be displayed for the given user request to view transactions of active users. The preview may enable a user to view the format in which the dataset will be displayed by using one of the provided customized code configurations in the associated application service. The preview may additionally include data headings, legends, descriptions, etc. In some implementations, the data access system may dynamically modify the preview based on a user type, user access level, dataset types and sizes, and the like.

Figure 6:
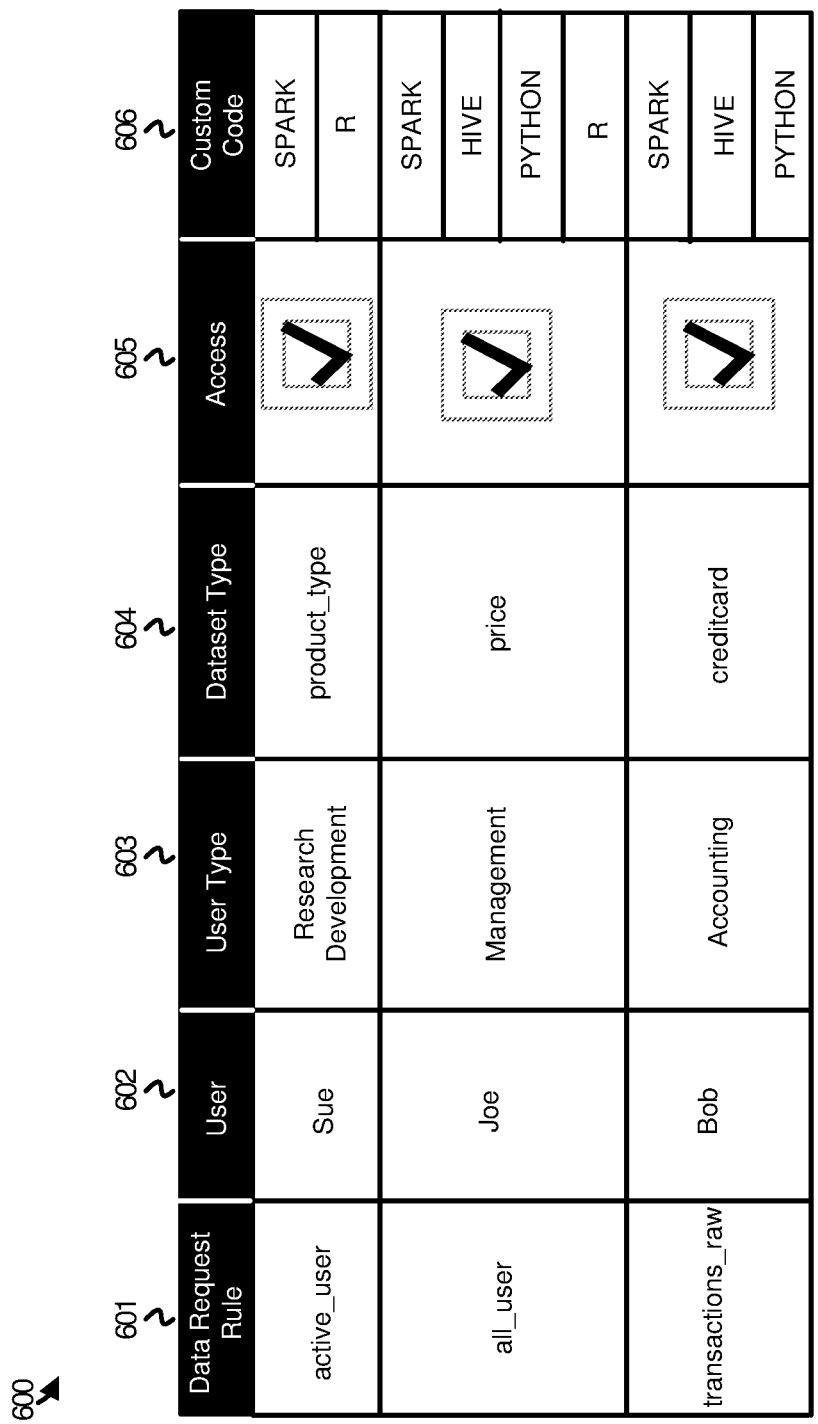
FIG. 6 illustrates an exemplary data structure which may be used to determine code configurations for each of the application services.

FIG. 6 illustrates an exemplary data structure which may be used to determine code configurations for each of the application services. As illustrated in data structure 600, each data request rule 601 is associated with various users 602, user types 603, and dataset types 604. Additionally, the data structure stores access approval statuses 605 associated with each user based on the user type and dataset type. For example, Bob in accounting has access to credit card number data. Finally, as can be seen in the customized code section 606, one or more customized code configurations are stored for each application service available for the specified data request rule 601, user 602, user type 603, dataset type 604, and access approval status 605. Although not shown for clarity, blocks of program code or template files are stored in data structure corresponding to each of the available application services.

FIG. 7 illustrates a computing system 700 to generate customized code configurations in a multiple application service environment according to one implementation. Computing system 700 is representative of any computing system or systems with which the various operational architectures, processes, scenarios, and sequences disclosed herein for generating data configurations may be employed. Computing system 700 is an example of data access system 101 from FIG. 1 and computing system 401 from FIG. 4, although other examples may exist. Computing system 700 comprises communication interface 701, user interface 702, and processing system 703. Processing system 703 is linked to communication interface 701 and user interface 702. Processing system 703 includes processing circuitry 704 and memory device 705 that stores operating software 706. Computing system 700 may include other well-known components such as batteries and enclosures that are not shown for clarity. Computing system 700 may comprise one or more servers, personal computers, routers, or some other computing apparatus, including combinations thereof.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 704 comprises microprocessor and other circuitry that retrieves and executes operating software 706 from memory device 705. Memory device 705 may include volatile and nonvolatile, removable and non-removable media implemented in any method or technology for storage of information, such as computer readable instructions, data configurations, program modules, or other data. Memory device 705 may be implemented as a single storage device, but may also be implemented across multiple storage devices or sub-systems. Memory device 705 may comprise additional elements, such as a controller to read operating software 706. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 704 is typically mounted on a circuit board that may also hold memory device 705 and portions of communication interface 701 and user interface 702. Operating software 706 comprises computer programs, firmware, or some other form of machine-readable program instructions. Operating software 706 includes query module 707 and code configuration module 708, although any number of software modules within the application may provide the same operation. Operating software 706 may further include an operating system, utilities, drivers, network interfaces, applications, or some other type of software. When executed by processing circuitry 704, operating software 706 directs processing system 703 to operate computing system 700 as described herein.

In at least one implementation, code configuration module 708, when read and executed by processing system 703, directs processing system 703 to maintain a data structure comprising a plurality of customized code configurations each associated with a data request rule for each of the multiple application services. When read and executed by processing system 703, query module 707 directs processing system 703 to receive a code configuration query from a user indicating a data request rule, wherein the code configuration query requests code configurations for data retrieval from at least one of the multiple storage services over the data access system. In addition, query module 707 directs processing system 703 to query the data structure for one or more customized code configurations for each of the multiple application services associated with the indicated data request rule. Code configuration module 708 then directs processing system 703 to provide the one or more customized code configurations for each of the multiple application services associated with the indicated data request rule to the user The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a data access service, wherein the data access service provides an interface layer between multiple application services and multiple storage services, the method comprising:
    maintaining, in the data access service, a data structure comprising a plurality of code configurations corresponding to a plurality of application services, wherein the plurality of code configurations are associated with a plurality of data request rules for retrieving data from a storage service that stores one or more datasets associated with a user,
    wherein for each data request rule of the plurality of data request rules, the data structure comprises at least one customized code configuration for each of the multiple application services, wherein the plurality of code configurations includes at least a first code configuration for a first type of application service including a block of program code that when run by the respective application service of the first type retrieves data stored in the storage service, and a second code configuration for a second type of application service including a block of program code in a different language that when run by the application service of the second type retrieves data stored in the same storage service;
    receiving, in the data access service, a code configuration query from an application service running on a user device, wherein the code configuration query is associated with at least one data request rule, wherein the at least one data request rule comprises at least one of a type of data search, dataset search initiated by the user, and whether the user has access to the plurality of code configurations based on a user's access level;
    in response to receiving the code configuration query, retrieving, in the data access service, the plurality of code configurations corresponding to the plurality of application services from the data structure based on the at least one data request rule;
    generating, in the data access service, one or more customized code configurations from the plurality of code configurations corresponding to the application services, wherein the one or more customized code configurations are generated based on determining that the user has access to the one or more customized code configurations based on the user's access level in the at least one data request rule;
    displaying, on a user interface running on a user device, options corresponding to the plurality of application services; and
    in response to receiving a selection of an option from the user interface, displaying on the user interface running on the user device, the generated custom code configuration corresponding to the option selected by the user.

2. The method of claim 1 further comprising suggesting, in the data access service, an additional code configuration query from the application service running on the user device indicating one or more additional data request rules.

3. The method of claim 1 wherein:
    the code configuration query from the application service further indicates a user type; and
    the one or more customized code configurations provided to the application service running on the user device are provided based on the indicated user type.

4. The method of claim 1 wherein:
    the code configuration query from the application service further indicates a dataset type; and the one or more customized code configurations provided to the application service running on the user device are provided based on the indicated dataset type.

5. The method of claim 1 wherein providing the one or more customized code configurations to the application service running on the user device comprises one or more of exporting and saving a file including each of the one or more customized code configurations.

6. The method of claim 1 wherein providing the one or more customized code configurations to the application service running on the user device comprises surfacing a view of each of the one or more customized code configurations.

7. The method of claim 1 wherein providing the one or more customized code configurations to the application service running on the user device further comprises displaying a preview of data retrieved by executing the one or more customized code configurations.

8. The method of claim 1 wherein the at least one of the multiple application services comprises one or more of a distributed application, an Open Database Connectivity (ODBC) service, and a Representational State Transfer (REST) service.

9. The method of claim 1 wherein the at least one of the multiple storage services comprises one or more of a file system, a Relational Database Management System (RDBMS), and a stream.

10. A computing apparatus comprising:
one or more computer readable storage media;
one or more processors operatively coupled with the one or more computer readable storage media; and
program instructions stored on the one or more computer readable storage media to operate a data access service that provides an interface layer between multiple application services and multiple storage services, wherein the program instructions, when read and executed by the one or more processors, direct the one or more processors to at least:
maintain, in the data access service, a data structure comprising a plurality of code configurations corresponding to a plurality of application services, wherein the plurality of code configurations are associated with a plurality of data request rules for retrieving data from a storage service that stores one or more datasets associated with a user,
wherein for each data request rule of the plurality of data request rules, the data structure comprises at least one customized code configuration for each of the multiple application services, wherein the plurality of code configurations includes at least a first code configuration for a first type of application service including a block of program code that when run by the respective application service of the first type retrieves data stored in the storage service, and a second code configuration for a second type of application service including a block of program code in a different language that when run by the application service of the second type retrieves data stored in the same storage service;
receive, in the data access service, a code configuration query from an application service running on a user device, wherein the code configuration query is associated with at least one data request rule, wherein the at least one data request rule comprises at least one of a type of data search, dataset search initiated by the user, and whether the user has access to the plurality of code configurations based on a user's access level;
in response to receiving the code configuration query, retrieve, in the data access service, the plurality of code configurations corresponding to the plurality of application services from the data structure based on the at least one data request rule;
generate, in the data access service, one or more customized code configurations from the plurality of code configurations corresponding to the application service, wherein the one or more customized code configurations are generated based on determining that the user has access to the one or more customized code configurations based on the user's access level in the at least one data request rule;
display, on a user interface running on a user device, options corresponding to the plurality of application services; and
in response to receiving a selection of an option from the user interface, display on the user interface running on the user device, the generated custom code configuration corresponding to the option selected by the user.

11. The computing apparatus of claim 10, wherein the program instructions, when read and executed by the one or more processors, further direct the one or more processors to suggest, in the data access service, an additional code configuration query from the application service running on the user device indicating one or more additional data request rules.

12. The computing apparatus of claim 10 wherein:
the code configuration query from the application service further indicates a user type; and
the one or more customized code configurations provided to the application service running on the user device are provided based on the indicated user type.

13. The computing apparatus of claim 10 wherein:
the code configuration query from the application service further indicates a dataset type; and
the one or more customized code configurations provided to the application service running on the user device are provided based on the indicated dataset type.

14. The computing apparatus of claim 10 wherein to provide the one or more customized code configurations to the application service running on the user device, the program instructions, when read and executed by the one or more processors, direct the one or more processors to export or save a file including each of the one or more customized code configurations.

15. The computing apparatus of claim 10 wherein to provide the one or more customized code configurations the application service running on the user device the program instructions, when read and executed by the one or more processors, direct the one or more processors to surface a view of each of the one or more customized code configurations.

16. The computing apparatus of claim 10 wherein to provide the one or more customized code configurations to the application service running on the user device the program instructions, when read and executed by the one or more processors, further direct the one or more processors to display a preview of data retrieved by executing the one or more customized code configurations.

17. The computing apparatus of claim 10 wherein the at least one of the multiple application services comprises one or more of a distributed application, an Open Database Connectivity (ODBC) service, and a Representational State Transfer (REST) service.

18. One or more computer-readable storage media having program instructions stored thereon to operate a data access service that provides an interface layer between multiple application services and multiple storage services, wherein the program instructions, that, when read and executed by a processing system, direct the processing system to at least:
   maintain, in the data access service, a data structure comprising a plurality of code configurations corresponding to a plurality of application services, wherein the plurality of code configurations are associated with a plurality of data request rules for retrieving data from a storage service that stores one or more datasets associated with a user,
   wherein for each data request rule of the plurality of data request rules, the data structure comprises at least one customized code configuration for each of the multiple application services, wherein the plurality of code configurations includes at least a first code configuration for a first type of application service including a block of program code that when run by the respective application service of the first type retrieves data stored in the storage service, and a second code configuration for a second type of application service including a block of program code in a different language that when run by the application service of the second type retrieves data stored in the same storage service;
   receive, in the data access service, a code configuration query from an application service running on a user device, wherein the code configuration query is associated with at least one data request rule, wherein the at least one data request rule comprises at least one of a type of data search, dataset search initiated by the user, and whether the user has access to the plurality of code configurations based on a user's access level;
   in response to receiving the code configuration query, retrieve, in the data access service, the plurality of code configurations corresponding to the plurality of application services from the data structure based on the at least one data request rule;
   generate, in the data access service, one or more customized code configurations from the plurality of code configurations corresponding to the application service, wherein the one or more customized code configurations are generated based on determining that the user has access to the one or more customized code configuration based on the user's access level in the at least one data request rule;
   display, on a user interface running on a user device, options corresponding to the plurality of application services; and
   in response to receiving a selection of an option from the user interface, display on the user interface running on the user device, the generated custom code configuration corresponding to the option selected by the user.

* * * * *